Oct. 10, 1933.  M. C. HAMMOND  1,930,313
AUTOMATIC LUBRICATING DEVICE
Filed March 10, 1932   2 Sheets-Sheet 1

Inventor,
Mark C. Hammond,
by Walter P. Guyer
Attorney.

Oct. 10, 1933.　　　M. C. HAMMOND　　　1,930,313
AUTOMATIC LUBRICATING DEVICE
Filed March 10, 1932　　　2 Sheets-Sheet 2
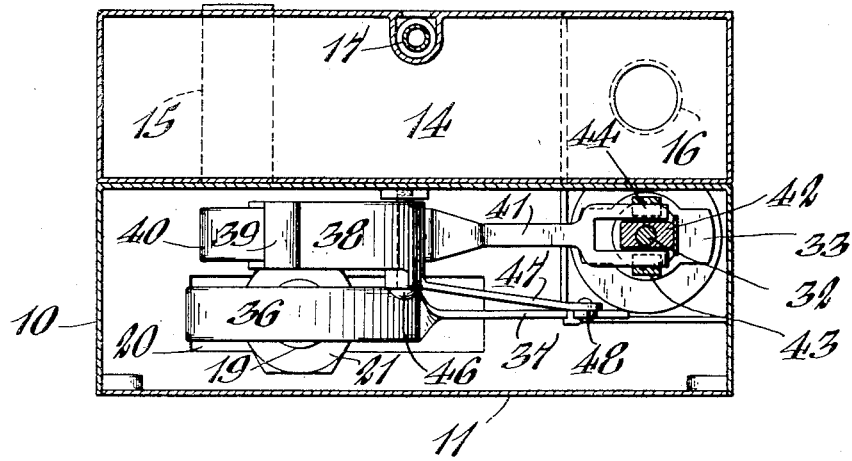
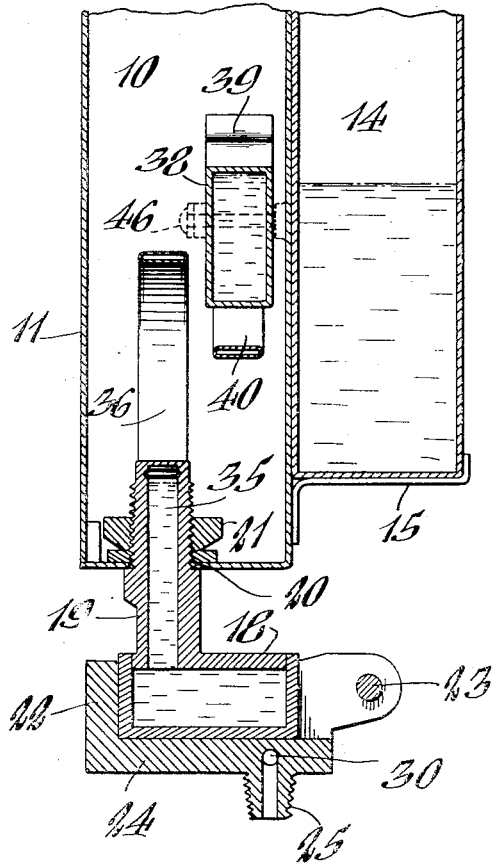
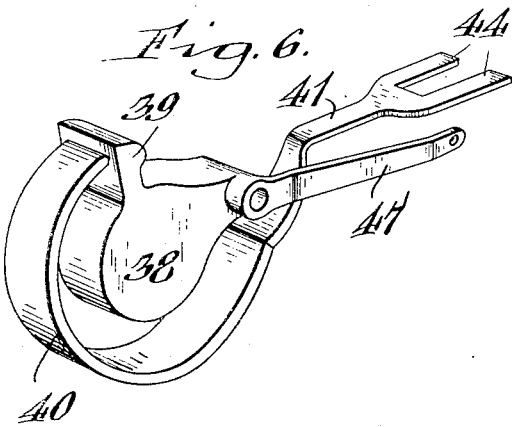
Inventor,
Mark C. Hammond,
by Walter P. Geyer
Attorney.

Patented Oct. 10, 1933

1,930,313

UNITED STATES PATENT OFFICE 1,930,313

AUTOMATIC LUBRICATING DEVICE

Mark C. Hammond, Bradford, Pa., assignor to Forest Oil Corporation, Bradford, Pa., a corporation of New York Application March 10, 1932. Serial No. 598,007

13 Claims. (Cl. 184—68)

This invention relates to certain new and useful improvements in devices or attachments for effecting the automatic lubrication of bearings on machinery of all kinds.

One of its objects is to provide an apparatus of this character having thermostatically controlled means for automatically governing the flow of lubricant to the bearing, the thermostatic means being controlled by the heat of the bearing in conjunction with the atmospheric temperature, whereby a correct amount of lubricant is delivered to the bearing at all times and danger of overcharging the bearing and wasting the lubricant is avoided.

Another object of the invention is to provide an automatic lubricating device which is simple and compact in construction, which is reliable, positive and efficient in operation, and whose parts are so organized and arranged that they are not liable to get out of order.

Other features of the invention reside in the combination and arrangement of parts hereinafter described and particularly pointed out in the appended claims.

In the accompanying drawings:—

Figure 1:
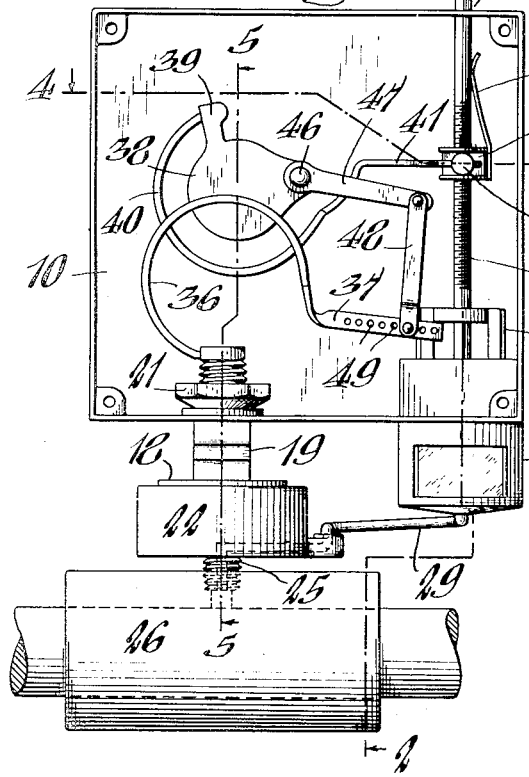
Figure 2:
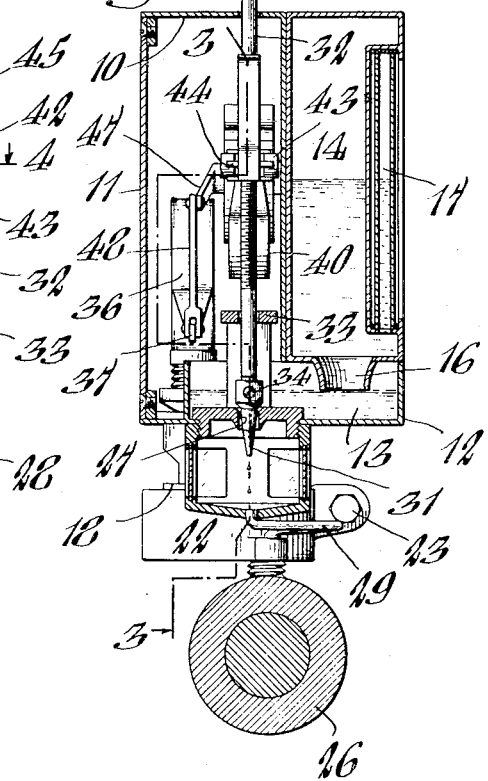
Figure 3:
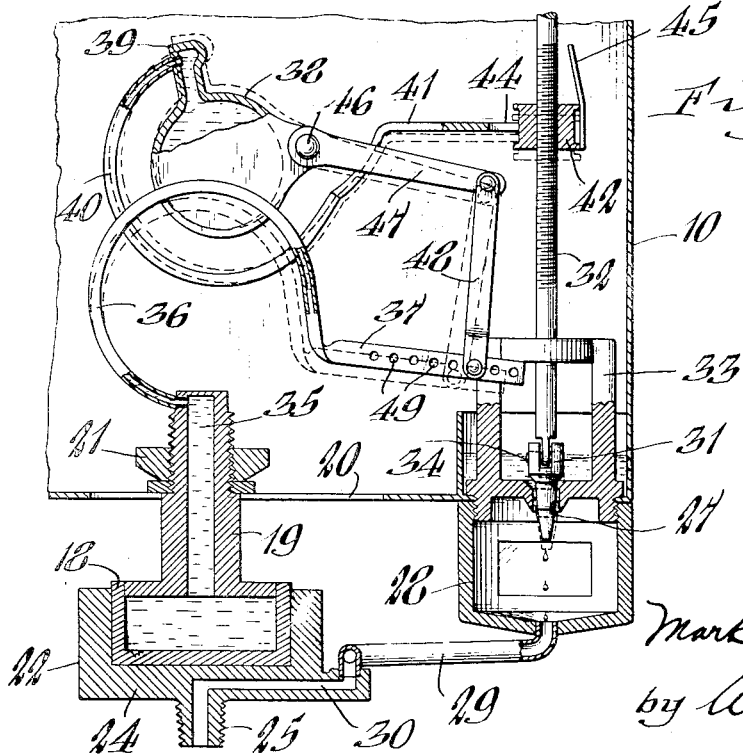

Figure 1 is a front elevation of my improved lubricating apparatus, the same being shown applied to a bearing and the cover plate of the casing being removed. Figure 2 is a transverse vertical section taken substantially in the plane of line 2—2, Figure 1. Figure 3 is an enlarged fragmentary longitudinal section taken substantially in the plane of line 3—3, Figure 2. Figure 4 is an enlarged horizontal section taken on line 4—4, Figure 1. Figure 5 is an enlarged fragmentary transverse vertical section taken on line 5—5, Figure 1. Figure 6 is a detached perspective view of the atmospherically controlled thermostat and associated parts.

Similar characters of reference indicate corresponding parts throughout the several views.

While the working parts of the lubricating device may be mounted in any suitable manner, I have shown the same, by way of example, as applied to a casing 10 of substantially box-like form which is provided on its front side with a cover plate 11 secured thereto by screws or other appropriate fasteners. Projecting from the lower rear side of this casing is an extension 12 shaped to form a lubricant feed compartment or well 13, and opening or communicating with this well is a lubricant reservoir 14 which is, by preference, detachably mounted on the rear side of the casing, resting at its lower side upon the extension 12 and a bracket 15 projecting rearwardly from the casing 10, as seen in Figures 2 and 5. At its lower end this reservoir is provided with a depending neck or discharge mouth 16 which opens into the lubricant compartment 13, said neck dipping into the contents of the latter and forming a fluid seal therewith, so that when the level of lubricant in the well 13 is above that of the discharge mouth 16, the lubricant is prevented from being discharged from the reservoir. However, when the level of the lubricant in the well 13 goes below that of the discharge mouth 16, a further supply of lubricant is discharged from the reservoir 14 into the well. If desired, a sight tube 17 may be applied to the wall of the reservoir 14 for readily observing the level of lubricant therein.

Carried by the casing and preferably depending from the bottom side thereof is a bearing thermostat 18 disposed in thermal contact with the bearing and having a stem 19 rising therefrom which engages a longitudinal slot 20 formed in the bottom wall of the casing 10 and having a clamping nut 21 at its upper end for securely fastening this thermostatic member in a set position. Fitted about this bearing thermostat is a bearing attaching element or coupling consisting of a split collar 22 clamped about the lower portion of the thermostat by a clamping bolt 23. Depending from the lower side or bottom 24 of this attaching element is a threaded stem 25 which serves as a means for connecting the lubricating device to the bearing 26, my device being applied in the same manner as any ordinary oil or grease cup.

The coupling element 22 is adapted for communication with the lubricant feed compartment 13 for supplying lubricant to the bearing and for this purpose this compartment has a valve-controlled port 27 opening downwardly into a sight glass holder 28 which in turn is connected by a pipe or conduit 29 with a passage 30 formed in the coupling element. This passage also extends through the attaching stem 25, from whence the oil is delivered to the bearing. Cooperating with the port 27 is a valve 31 having a stem 32 rising therefrom which is guided for vertical movement in a yoke 33, the valve being preferably connected to the lower end of the stem by a transverse pivot pin 34 which permits the valve to have a swivel-like action and thereby adapt itself to be uniformly seated about the valve port in its closed position.

Means are provided for thermostatically controlling the opening and closing movements of the valve so as to govern the correct flow of lubricant to the bearing and eliminate or avoid the possibility of wasting or delivering an oversupply of oil to the bearings. In my arrangement of thermostatic means for accomplishing this purpose, I provide two cooperating thermostatic elements for governing the opening and closing movements of the valve 31, one of which may be called a bearing thermostat which is arranged in thermo-contact with the bearing being lubricated and which, in response to temperature changes of the bearing, effects either an opening or closing action of the valve. The companion thermostatic element may be termed an atmospheric thermostat which is operatively connected to the bearing thermostat and the valve and which acts to modify or limit the opening of the valve to compensate for temperature differences between the atmosphere and that of the bearing. For example, should the bearing temperature read 80° Fahr., and the atmospheric temperature read 60° Fahr., and the atmospheric temperature be raised 10° to read 70°, then the bearing temperature is likewise increased 10° and becomes 90°, with the result that the bearing thermostat tends to open the valve an amount corresponding to the 10° difference in temperature and the companion temperature thermostat tends to close the valve in accordance with that same 10° difference in temperature, thereby maintaining the valve in the same position to discharge a normal correct amount of lubricant to the bearing and prevent its being given an overdose or under dose of lubricant.

The bearing thermostat 18 is preferably in the form of a drum seated in the bearing-engaging element 22, and the stem 19 rising therefrom is hollow to provide a passage 35, the latter and its drum being filled with glycerin or like material. Attached at one end to the upper end of this stem and in communication with the fluid contents thereof, is a temperature-responsive element preferably in the form of a tubular loop or band 36 which is likewise filled with the fluid contents of the drum 18 and whose free end terminates in an arm 37 which is adapted to be operatively connected preferably through the medium of the atmospheric thermostat, presently to be described, to the valve stem 32 so that upon expansion of the element 36 the valve is automatically opened and upon contraction of the same, the valve is automatically closed.

The atmospheric thermostat is preferably in the form of a drum 38 filled with sodium chloride or like material and connected to a hollow arm 39 projecting therefrom is a temperature-responsive element 40 of similar shape and form as that of the companion bearing thermostatic element 36. Said element 40 is disposed in opposing relation to that of the companion element 36 and terminates at its free end in an arm 41 which is operatively connected to the valve stem 32. As a form of connection between this arm and the valve stem, I provide the latter with an adjusting nut 42 having bearing elements 43 thereon in which the forked end 44 of the arm 41 is adapted to engage, so that upon actuation of said arm by the thermostatic control elements 36 and 40, the valve stem is correspondingly raised or lowered. By shifting the nut 42 lengthwise on its stem, the valve 31 may be accordingly adjusted, and to prevent displacement of the valve out of its said adjusted position, I provide a tension spring 45 secured at one end to the adjusting nut 42 and bearing at its free end against the valve-stem.

For the purpose of transmitting the motion of the temperature-responsive element 36 of the bearing thermostat to the valve 31 and in such way that the atmospheric thermostat may have a modifying or controlling opposing action thereon when desired, I mount the drum 38 of the atmospheric thermostat on a horizontal pivot pin 46 secured to the adjoining wall of the casing 10, so that the same is free to oscillate in a vertical plane or in a direction corresponding to the movements of the temperature-responsive elements 36 and 40. Projecting from the drum 38 on the opposite side of the pivot pin 46 is an actuating arm 47 which is joined by a link 48 with the arm 37 of the thermostatic element 36, the drum and said arm together constituting an oscillating member or rock lever. Thus, should the bearing thermostatic element 36 be expanded, the arm 47 will be correspondingly actuated and the drum 38 of the atmospheric thermostat will be oscillated in a direction to effect the opening of the valve. Should the bearing thermostatic element 40 be contracted, the valve will be accordingly lowered to a closed position. Furthermore, should the atmospheric temperature be increased to effect an expansion of its element 40, there will be a tendency to effect a downward movement of the arm 41 in opposition to that of the bearing thermostatic element 36 to raise the arm 41 to open the valve, the atmospheric thermostatic element 40 thereby introducing or constituting a modifying or limiting element and preventing the opening of the valve 31 unduly. In other words, the atmospheric thermostatic element 40 is so coordinated with the bearing thermostatic element 36 that it corrects or automatically governs the amount of opening of the valve 31 depending upon the existing temperature difference between the atmosphere and the bearing. It will be also understood that the thermostatic element 40 functions, should the temperature difference warrant it, to assist in the opening of the valve, as for example, when machinery is exposed to extreme cold.

As previously stated, the bearing thermostat together with its associated parts is supported from the casing 10 through the medium of the attaching stem 19 and the clamping nut 21. Should it be desired to adjust this thermostat relative to that of the atmospheric thermostat and thereby vary the linkage connection between these parts for regulating the action of the valve 31, this can be readily accomplished by shifting the supporting stem lengthwise of the casing-slot 20. Furthermore, the arm 37 of the thermostatic element 36 may be provided with a row of holes 49 for adjustably connecting the link 48 thereto.

The two thermostats 18 and 38 are preferably so coordinated and adjusted so as to effect the closing of the valve 31 more at high temperatures to deliver a less amount of lubricant to the bearing, and to effect its opening a greater amount at lower temperatures in order to compensate for the difference in viscosity of the lubricant, which, as is well known, is comparatively thin at high temperatures and more or less thick at low temperatures. This arrangement of the two thermostats thereby insures that the bearing at low temperatures will receive a sufficient amount of lubricant and prevent undue friction which wears or melts the bearing.

I claim as my invention:—

1. A lubricating device of the character described, comprising a casing having a lubricant-receiving compartment, a valve for controlling the delivery of the lubricant to the part to be lubricated, and combined thermostatic means including connections to the valve and operable in accordance with the bearing temperature and the atmospheric temperature, respectively, for governing said valve, one of the thermostatic means being in thermal contact with the lubricated part and the other with the atmosphere, the latter operating to modify the governing action of the former to compensate for existing temperature differences between the atmosphere and that of the bearing.

2. A lubricating device of the character described, comprising a casing having a lubricant-receiving compartment, a valve for controlling the delivery of the lubricant to the part to be lubricated, a thermostat adapted for thermal contact with the lubricated part, a second thermostat responsive to atmosphere temperature changes, and means for operatively connecting said thermostats to each other and to the valve for governing the opening and closing movements of said valve, respectively.

3. A lubricating device of the character described, comprising a casing having a lubricant-receiving compartment, a valve for controlling the delivery of the lubricant to the part to be lubricated, a bearing thermostat adapted for thermal contact with the bearing to be lubricated and operatively connected to said valve to open it in accordance with the heat of the bearing, and an atmospheric thermostat operatively connected to the valve for effecting its closing in accordance with the rise of the atmospheric temperature.

4. A lubricating device of the character described, comprising a casing having a lubricant-receiving compartment, a valve for controlling the delivery of the lubricant to the bearing to be lubricated, a thermostat in thermal contact with the bearing and including a temperature responsive element for governing the actuation of said valve, and thermostatic means operatively connected with said bearing thermostat for limiting the action thereof in accordance with the atmospheric temperature.

5. In a lubricating device, a valve for controlling the flow of lubricant to the bearing, a thermostat adapted for disposition in thermal contact with the bearing for governing the valve, an operative connection between said thermostat and the valve, and means interposed in said connection for modifying the movement thereof in accordance with temperature differences between the bearing and that of the atmosphere.

6. In a lubricating device, a valve for controlling the flow of lubricant to the bearing, a thermostat adapted for disposition in thermal contact with the bearing for governing the valve, an operative connection between said thermostat and the valve, and a second thermostat included in said connection for modifying the action of said bearing thermostat in accordance with changes in atmospheric temperature.

7. In a lubricating device, a valve for controlling the flow of lubricant to the bearing, a thermostat adapted for disposition in thermal contact with the bearing and including a temperature responsive element, an oscillating connection between said thermostatically-actuated element and said valve, and an atmospherically-controlled temperature responsive element included in said oscillating connection.

8. In a lubricating device, a valve for controlling the flow of lubricant to the bearing, a thermostat adapted for disposition in thermal contact with the bearing and including a temperature responsive element, and a rock lever fulcrumed intermediate its ends and having one arm connected to said thermostatically-actuated element, the other arm including an atmospherically-governed thermostatic element connected to said valve.

9. In a lubricating device, a valve for controlling the flow of lubricant to the bearing, a thermostat adapted for disposition in thermal contact with the bearing and including a temperature responsive element, and a rock lever fulcrumed intermediate its ends and having one arm connected to said thermostatically-actuated element, the other arm including a fluid-expansion chamber having a thermostatic element connected at one end thereto and at its free end to said valve.

10. In a lubricating device, a valve for controlling the flow of lubricant to the bearing, a thermostat adapted for disposition in thermal contact with the bearing and including a temperature responsive element, and a rock lever fulcrumed intermediate its ends and having one arm connected to said thermostatically-actuated element, the other arm including a loop-shaped atmospherically-governed thermostatic element having its free end connected to said valve.

11. In a lubricating device, a valve for controlling the flow of lubricant to the bearing, a thermostat adapted for disposition in thermal contact with the bearing and including a substantially loop-shaped, temperature-responsive element, a rock member having one arm operatively connected to the free end of said thermostatic element, and a similar atmospherically-controlled thermostatic element applied to the other arm of said rock member and operatively connected to said valve, the first-named thermostatic element acting upon its expansion to open the valve and the second-named element acting upon its expansion to close the valve.

12. A lubricating device of the character described, comprising an attaching member for application to a bearing to be lubricated and having a passage therein discharging into the bearing, a casing supported on said member and having a lubricant-receiving compartment in communication with said discharge passage, a valve for controlling the flow of lubricant to said passage, and combined thermostatically-controlled means including connections to the valve operable in accordance with the bearing temperature and the atmospheric temperature, respectively, for governing said valve, one of the thermostatic means being in thermal contact with the lubricated part and the other with the atmosphere, the latter operating to modify the governing action of the former to compensate for existing temperature differences between the atmosphere and that of the bearing.

13. A lubricating device of the character described, comprising an attaching member for application to a bearing to be lubricated and having a passage therein discharging into the bearing, a casing supported on said member and having a lubricant-receiving compartment in communication with said discharge passage, a valve for controlling the flow of lubricant to said passage, a thermostat in thermal contact with said bearing attaching member and including a temperature responsive element, an operative connection between said thermostatic element and said valve, and a second thermostat included in said connection for modifying the action of said first-named thermostat in accordance with the existing temperature differences between the bearing and that of the atmosphere.

MARK C. HAMMOND.